April 30, 1963    G. F. QUAYLE    3,087,564
LONGITUDINAL AND TRANSVERSE STEERING FOR INDUSTRIAL TRUCK
Filed Jan. 17, 1961    4 Sheets-Sheet 3

INVENTOR.
GEORGE F. QUAYLE
BY
ATTORNEY

INVENTOR.
GEORGE F. QUAYLE
BY
ATTORNEY

United States Patent Office 3,087,564
Patented Apr. 30, 1963

3,087,564
LONGITUDINAL AND TRANSVERSE STEERING
FOR INDUSTRIAL TRUCK
George F. Quayle, Philadelphia, Pa., assignor to The Yale
and Towne Manufacturing Company, Stamford, Conn.,
a corporation of Connecticut
Filed Jan. 17, 1961, Ser. No. 83,213
16 Claims. (Cl. 180—79.2)

This invention relates to a steering mechanism for an industrial truck.

The novel concept of my invention is a mechanism that controls the wheels of an industrial truck to effect different steering combinations of wheels. My mechanism is particularly adapted to steer one wheel or different pairs of wheels of an industrial truck, the pairs of wheels being arranged to steer the truck in longitudinal or sidewise directions.

As a feature of my invention I utilize means that control and interconnect wheels of an industrial truck whereby to effect steering by different combinations of wheels, while certain wheels are held against steering. As a preferred part of this feature, those means comprise a series of hydraulic rams. Thus, when a ram is relieved of fluid pressure, it will allow relative steering rotation of two wheels whereas when pressurized the ram will become rigid to hold the wheels in predetermined steering relation or in non-steering relation to the truck.

As a particular feature of my invention, I utilize a single basic steering wheel that may be steered alone or may be steered with either one of two additional wheels of the truck while other wheels are held in certain steered relation to the truck. The control means or hydraulic rams that I utilize, will function to hold the various wheels in the different types of steering or non-steering relationship required.

A further and more detailed feature of my invention resides in novel means that are adapted to effect an exact steering relation between wheels of the truck. More particularly, I connect stop portions to certain wheels, with a hydraulic ram that is pressurized to hold the stop portions engaged. The wheels then will steer in predetermined relation to one another, but can steer independently when the ram is not pressurized.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

FIG. 5 shows a hydraulic circuit that may be used for controlling the steering.

Figure 1:
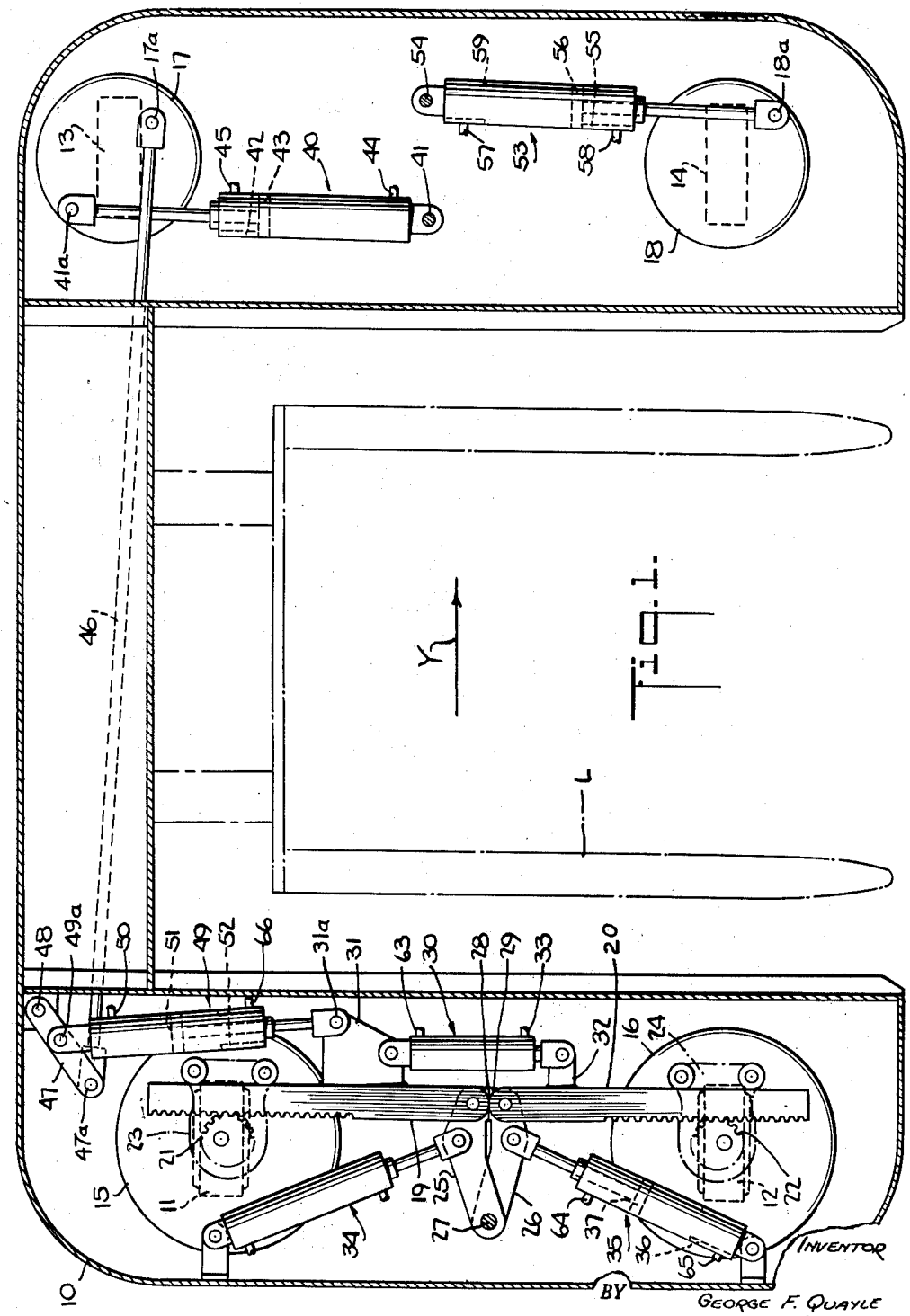
FIG. 1 is a plan view of my novel industrial truck steering mechanism in a position to steer longitudinal movement of the truck.

For the purpose of describing my invention, I show in FIG. 1 of the drawings an industrial truck frame 10 equipped with four wheels 11, 12, 13, 14, one at each corner of the frame. Those wheels are supported on frame 10 through corresponding mountings 15, 16, 17, 18 that rotate on suitable bearings, not shown. In the construction I have chosen to illustrate, frame 10 is U-shaped and has load engaging means L that are directed toward one side of the truck, but particular details of the frame 10 are not important to an understanding of my novel steering mechanism. It is necessary to know merely that the most universal truck embodying my invention has at each corner a wheel that can be steered on an individual mounting. For convenience in describing my invention, I shall refer to the wheels 11, 12 as rear wheels, and to the wheels 13, 14 as front wheels, it being understood that the truck actually can move in various directions.

Referring now more particularly to FIG. 1 of the drawings, I utilize in my novel steering mechanism a pair of rods 19, 20, so connected to the rearward rotating mountings 15, 16 that said rods will through longitudinal movement effect steering rotation of each rear wheel 11, 12. The construction that I prefer is substantially that shown in my earlier Patent No. 2,916,294. Thus, the rods 19, 20 are in the form of racks meshing with eccentric gears 21 that are integrally secured to the steering mountings 15, 16 so as to rotate therewith. Guides 23, 24 hold the racks 19, 20 relatively to the gears 21, 22. It should be understood naturally that my invention is not to be limited to the use of racks.

Figure 2:
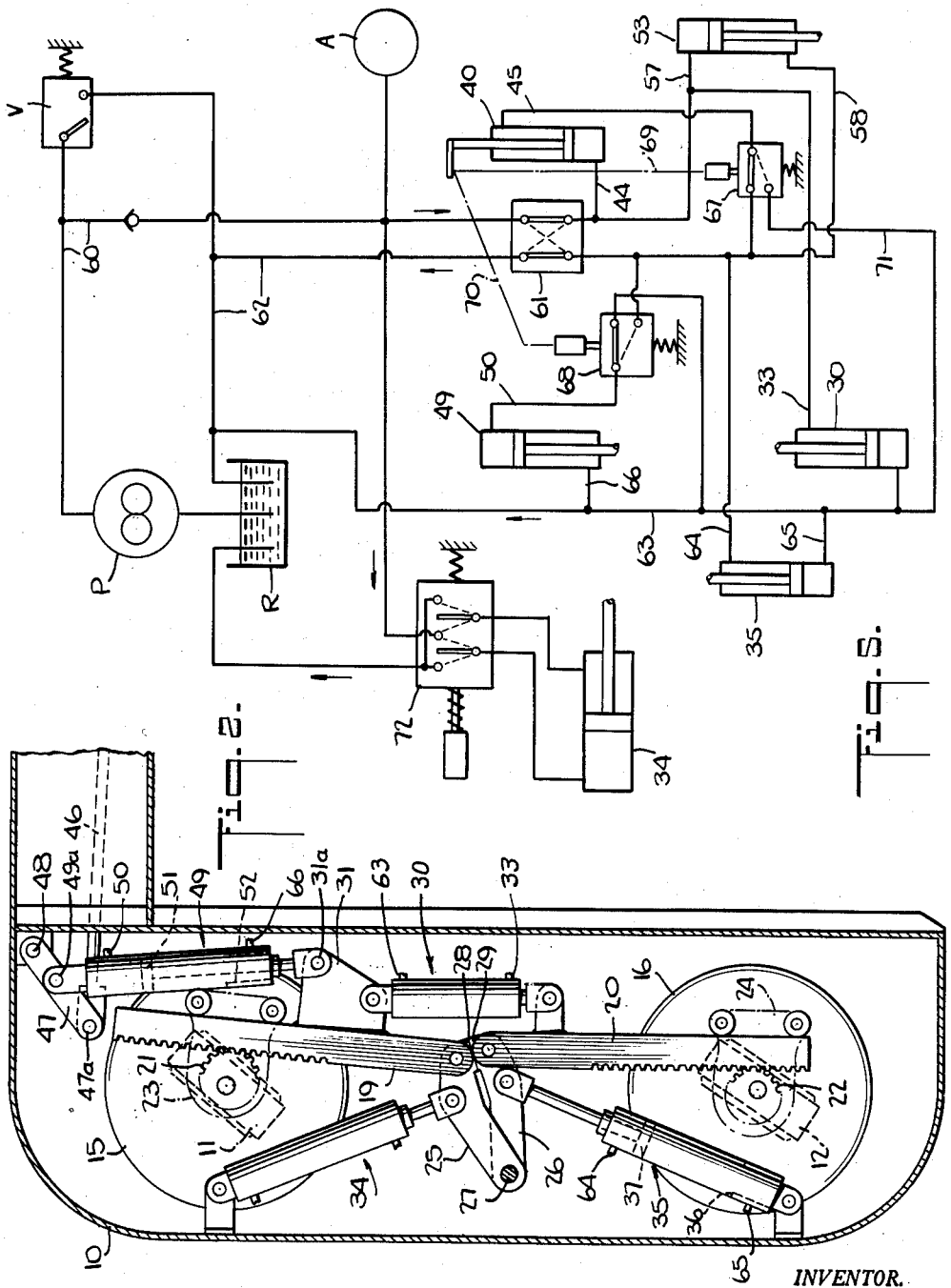
FIG. 2 illustrates steering of the longitudinal truck movement.

As is well shown in FIG. 1, the racks or rods 19, 20 extend substantially in aligned relation to one another, with juxtaposed ends of those rods pivoted to corresponding levers 25, 26. The levers 25, 26 are mounted on a pivot 27 fixed to the truck frame 10, each lever rotating individually as the corresponding rod 19 or 20 moves to steer one of the wheels 11, 12. Since each of levers 25, 26 is adapted to be moved individually, as will be set forth presently, the wheels 11, 12 may be steered independently of each other, as will be seen in FIG. 4. Actually, wheel 11 is the basic steered wheel, which can steer in combination with either of two other wheels. By locking levers 25, 26 to form a single lever, in effect, it is possible to steer both wheels 11, 12 together as seen in FIG. 2.

For this purpose I equip the levers 25, 26 with opposed stop portions 28, 29 that engage as shown in FIG. 1. Also, I utilize between the rods 19, 20 a rather conventional hydraulic ram 30, pivoting opposed ends of the ram 30 to a bracket 31 on rod 19, and to a bracket 32 on rod 20. When fluid pressure is applied through a hydraulic line 33 to one end of ram 30, the ram will hold the stop portions 28, 29 firmly engaged, thus locking rods 19, 20 to each other. Thereby the rods 19, 20 will become in effect an integral rod holding the two rear wheels 11, 12 in predetermined steering relation, as is indicated in FIGS. 1 and 2. When locking ram 30 is relieved of fluid pressure, so as to float in effect, rods 19 and 20 can move relatively to each other, as indicated in FIGS. 3 and 4, allowing the steering of wheel 11 while wheel 12 is otherwise controlled.

I shall describe presently a hydraulic circuit that may be used to control the locking ram 30 and additional rams of my steering mechanism, but my invention will be more easily understood if I first describe each ram and its operation. It should here be emphasized that my invention will not require a particular hydraulic circuit, and will operate very well if each ram is separately controlled.

On the rear end of the truck I utilize a pair of hydraulic steering rams 34, 35, well shown in FIG. 1. Ram 34 is the basic steering ram, and extends between frame 10 and lever 25, always being effective through lever 25 and rod 19 for steering the rear wheel 11. Ram 35 extends between frame 10 and lever 26 and steers wheel 12 through rod 20 when such steering is required. When the locking ram 30 is actuated to lock rods 19, 20 to one another, the ram 34 will steer the rear wheel 12 together with wheel 11, as shown in FIG. 2. This is made possible by relieving ram 35 of fluid pressure so as to float and not oppose the operation of ram 34. When locking ram 30 is relieved of fluid pressure so as to float, ram 35 may in turn be pressurized to steer wheel 12 separately, as in FIGS. 3 and 4. It will be seen that relief of pressure in ram 30 makes wheel 11 independent of wheel 12.

Figure 3:
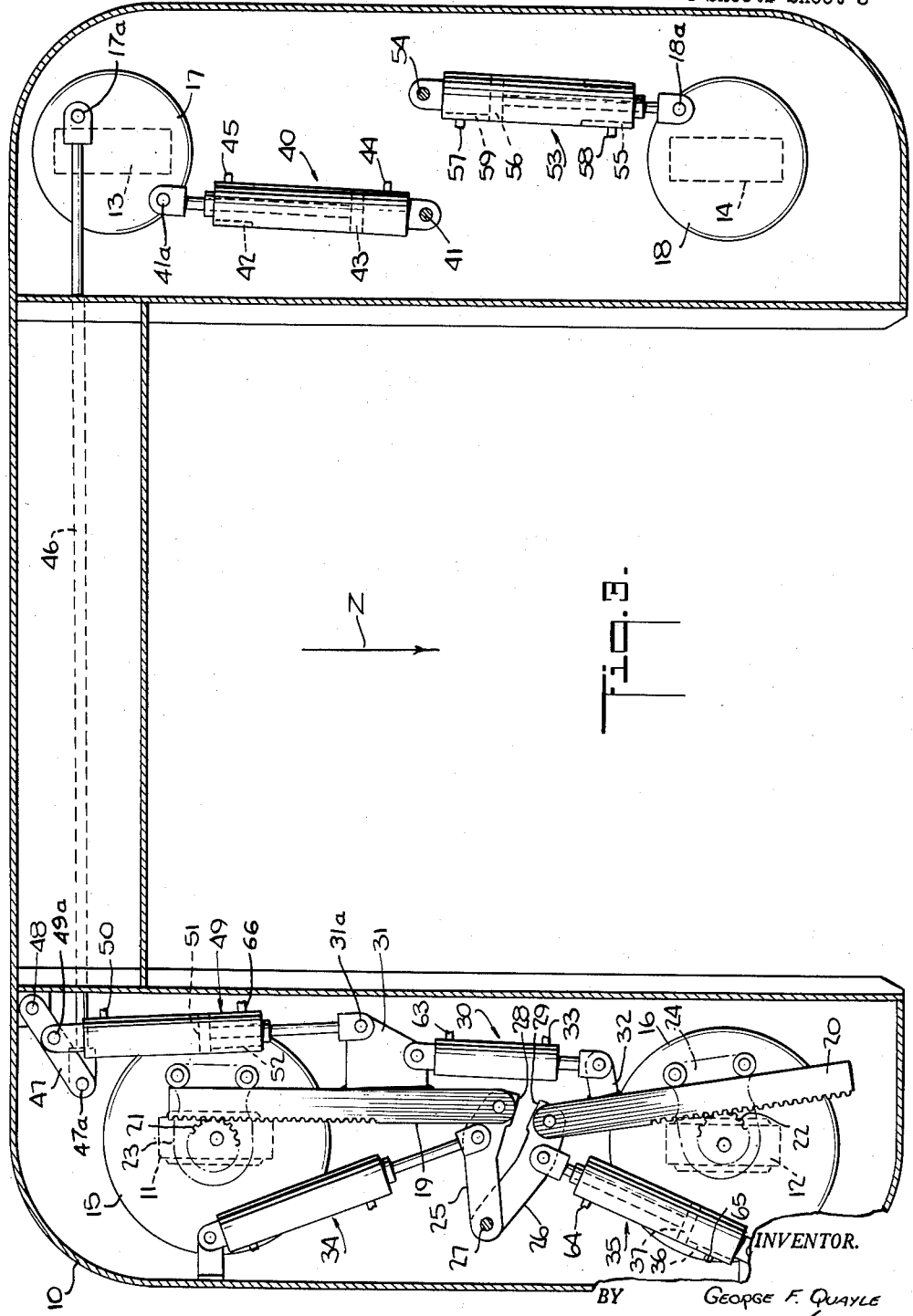
FIG. 3 shows my mechanism in position to steer sidewise movement of the truck.
Figure 4:
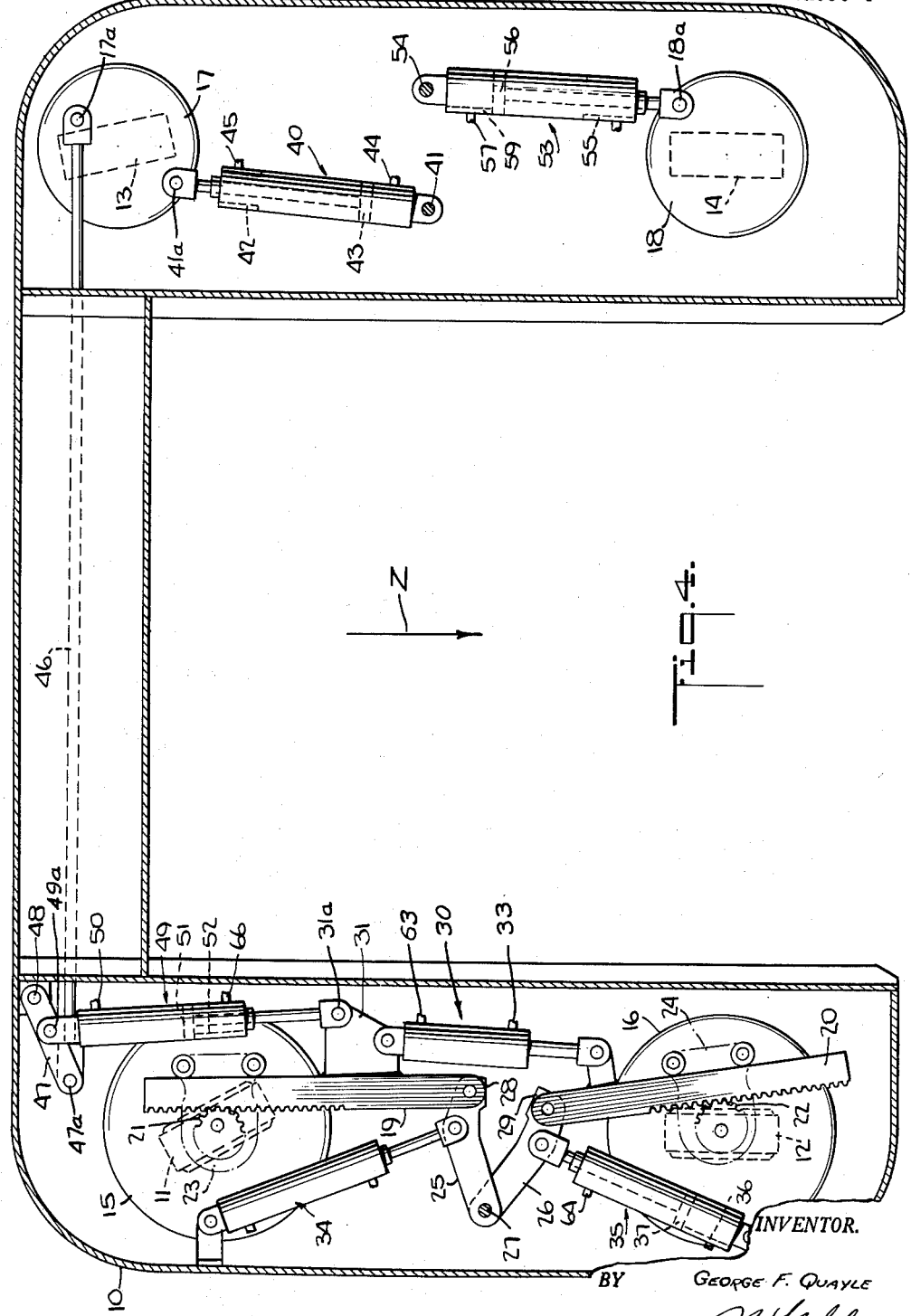
FIG. 4 illustrates steering of the sidewise movement.

At this point I call attention to the fact that ram 35 has an internal stop 36 against which the fluid pressure will hold piston 37, whereby to lock wheel 12 in the steering position shown in FIGS. 3 and 4. That is the position of wheel 12 when the truck is to be steered generally sidewise in the direction of arrow Z.

From the description thus far presented, it will be seen that I may interconnect the two rear wheels 11, 12 for steering either in predetermined relation to each other, or separately. Thus, the steering rotation of wheel 11 may be accompanied by steering rotation of wheel 12, but as an alternative, wheel 11 can be steered while wheel 12 is locked in a particular steering position. I shall now describe those parts of my mechanism whereby I control the steering rotation of two front wheels 13, 14.

Referring to FIG. 1, the longitudinal steering position of wheel 13, which is at the same side of the truck as is rear wheel 11, will be controlled by a hydraulic ram 40. The ram 40 extends between a pivot 41 on truck frame 10, and a pivot 41a on the rotating mounting 17 of wheel 13. Further, ram 40 has an internal stop 42 against which its piston 43 will move. The stop 42 is so positioned that fluid pressure applied through a line 44 to ram 40 will lock the wheel 13 in the longitudinal steering position shown in FIG. 1. That is the position of wheel 13 when the truck is to be steered generally in the direction of arrow Y. At the proper time, as I shall describe, fluid pressure will be applied through a line 45 to ram 40, to move wheel 13 away from its longitudinal steering position of FIG. 1, and toward the sidewise position shown in FIG. 3.

Also pivotally connected to the steering mounting 17 at 17a is a link 46, extending longitudinally of the truck from a pivot 47a on a crank 47 that is mounted through a pivot 48 on a rear part of truck frame 10. A hydraulic ram 49 is pivoted at one end through a pivot 49a to crank 47, while its other end is pivoted at 31a to bracket 31 on the steering rack or rod 19. Fluid pressure applied through a line 50 to the ram 49 will hold the piston 51 against an internal stop 52 of the ram, causing ram 49 to become a rigid link. Thereby ram 49 will link rod 19 and rear wheel 11 on the one hand, relatively to crank 47, link 46 and front wheel 13 on the other hand. Thus, it follows that ram 49 is adapted to lock the rear wheel 11 and front wheel 13 in predetermined steering relation to one another. However, in the position of my mechanism shown in FIG. 1, let us assume that the ram 49 is relieved of fluid pressure so as to float, allowing wheels 11 and 13 to rotate independently as will be set forth shortly.

Thus, in FIG. 1, the ram 40 may hold the front wheel 13 in the longitudinal steering position shown. The ram 49 is relieved of pressure so that rear wheel 11 may be steered, as by its ram 34, freely of front wheel 13. If pressure is simultaneously applied to ram 30 to lock together rods 19 and 20, then ram 34 also steers rear wheel 12 together with wheel 11, provided ram 35 is relieved of fluid pressure so as to float.

Still further, in FIG. 1 the front wheel 14 may be held in longitudinal steering position through a ram 53 extending between a pivot 54 on truck frame 10 and a pivot 18a on the steering mounting 18, that ram having an internal stop 55 against which piston 56 is held by fluid pressure applied through a line 57.

In FIG. 1, therefore, we see that front wheels 13, 14 may be held in longitudinal steering positions. Rear wheels 11, 12 may be connected through ram 30 so as to be steered together. Thus through actuation of the steering ram 34 while ram 35 floats, rear wheels 11, 12 may be steered in predetermined relation to each other, as for example into the position illustrated in FIG. 2.

When the truck is to be steered sidewise or at right angles to the direction of arrow Y of FIG. 1, front wheel 14 may be rotated and held in a sidewise position by fluid pressure applied through a line 58 to ram 53, the pressure acting to hold piston 56 against a stop 59. Ram 40 may be actuated to rotate the front wheel 13 from its FIG. 1 longitudinal position toward the FIG. 3 sidewise position. With ram 49 floating and ram 30 pressurized, while ram 35 is also floating, the steering ram 34 may be pressurized to rotate rear wheels 11 and 12 toward the sidewise position of FIG. 3. Now the ram 40 as well as ram 30 may be relieved of fluid pressure while the connecting ram 49 is pressurized to rotate and to hold wheel 13 in predetermined relation to wheel 11. This will allow the steering ram 34 to steer front wheel 13 as well as rear wheel 11. Also, with the locking ram 30 relieved of fluid pressure, wheel 12 may be held in its FIG. 3 sidewise position through pressure applied to ram 35.

Therefore, in the position of my parts shown in FIG. 3, and with the several rams controlled as described, wheels 12 and 14 at one side of the truck are held in a sidewise steering position. Also, wheels 11 and 13 at the opposite side of the truck are connected to be steered in predetermined relation to each other, and may be so steered by ram 34. This will effect sidewise steered movement of the truck, as is best illustrated in FIG. 4 where steered wheels 11 and 13 are shown rotated somewhat from their position of FIG. 3.

I have alluded earlier to a hydraulic circuit that can be used to control the rams of my novel mechanism, so as to obtain the different steering combinations I have described, and I shall now refer to FIG. 5 to describe that circuit. However, it is again emphasized that individual control of the rams is possible, if rams are utilized as the power means. In FIG. 5, I show diagrammatically a pump P that will draw hydraulic fluid from a reservoir R, and direct fluid pressure through a line 60 to a four-way valve 61. Merely for purposes of disclosure, I show a rather conventional arrangement for controlling the fluid pressure, including a pressure relief valve V connected to the high pressure line 60 to direct excess fluid back through a low pressure line 62 to the reservoir R. Also, I indicate an accumulator A tending to maintain uniform pressure in line 60.

The valve 61 is a conventional four-way valve and will be manually controlled to select either the longitudinal or sidewise steering operation of my mechanism. As actually shown in FIG. 5, the four-way valve 61 is in a position for effecting longitudinal steering of the truck, i.e., the steering shown in FIGS. 1 and 2, in the general direction of the arrow Y. Thus, valve 61 directs the pressure from line 60 through line 44 to one end of hydraulic ram 40, and also through line 57 to ram 53. Also, the opposed end of each ram 40, 53 is connected through corresponding lines 45 and 58, and through valve 61, to the low pressure line 62. It will be appreciated that the fluid pressure acting on rams 40, 53 holds both front wheels 13, 14 of the truck in the longitudinal steering position illustrated in FIGS. 1 and 2.

Further, valve 61 now is applying the fluid pressure from line 60 through line 33 to one end of ram 30, the opposed end of ram 30 always being connected through a low pressure line 63 to reservoir R. Thus, ram 30 is pressurized to lock the steering racks 19, 20 to one another. Also, the ram 35 now is merely connected through lines 64, 65 between the two low pressure lines 62, 63 so as to float and to allow free steering of the rear truck wheel 12. Also, both ends of ram 49 are connected through lines 50 and 66 to the low pressure line 63, so that ram 49 floats. With wheels 13 and 14 held by pressurized rams 40 and 53, and with ram 30 pressurized to hold racks 19, 20 for movement together, it is obvious that wheels 11 and 12 can be steered by ram 34 as ram 35 floats.

It will be seen in FIG. 5 that there are two valves 67, 68 interposed one in each of the lines 45, 50 leading from the corresponding rams 40, 49. The ram 40 is adapted to act through mechanical connections that I show diagrammatically at 69 and 70 to actuate valves 67, 68. The arrangement is such that valve 67 when actuated will disconnect line 45 relatively to valve 61, and connect line 45 through a line 71 to the low pressure line 63. Also, valve 68 then will disconnect the line 50 from pressure line 63 and connect that line 50 to the valve 61.

Let us now assume that the truck driver moves valve 61 to place my mechanism in the sidewise steering position shown in FIG. 3. Valve 61 now is in the position indicated in dotted lines in FIG. 5, applying fluid pressure from line 60 through valve 67 and line 45 to the ram 40. That rotates truck wheel 13 toward its sidewise position of FIG. 3. Next, the movement of ram 40 acts through the mechanical connection 70 to actuate valve 68 to its dotted line position, applying the high pressure from valve 61 to line 50, and pressurizing the ram 49 so as to connect the two truck wheels 11, 13. Then, the movement of ram 40 will be effective through the mechanical connection 69 to actuate valve 67 to its dotted line position, relieving the fluid pressure in ram 40. Ram 40 thereafter will float, and will not oppose steering of wheel 13 through the ram 49, which is now rigid.

It will be appreciated that valve 61 is now directing the fluid pressure through line 58 to ram 53 and through line 64 to ram 35, pressurizing those rams to hold wheels 12, 14 in sidewise steering position. Ram 30 naturally floats, because its line 33 now is connected through valve 61 to the low pressure, allowing the relative steering between rear wheels 11, 12. Should the ram 34 now steer the basic steering wheel 11, that ram also will steer front wheel 13 in predetermined relation to wheel 11 as exemplified in FIG. 4. Wheels 12 and 14 have been locked in the positions shown, and ram 34 will very effectively steer the truck in sidewise directions, indicated generally by the arrow Z. Naturally, a series of manual valves may be utilized to control the individual rams, but I do prefer to utilize the hydraulic system I have described.

In FIG. 5 I also show a rather conventional arrangement for actuating the steering ram 34. Thus, there is a four-way steering valve 72 that is connected to the high pressure line 60 and also to the reservoir R, and adapted to be operated by the truck driver to direct the pressure to either end of steering ram 34. I believe that it will be unnecessary to describe the actuation of the ram 34 in detail, since I simply utilize conventional movements of ram 34 to rotate rear truck wheel 11 on its mounting. Actually, I may utilize manual means for the steering of rear wheel 11, and it is merely necessary to understand that wheel 11 is the basic steering wheel to which I impart guided steering rotation. Because I steer with rear wheel 11 either rear wheel 12 or front wheel 13 alternately, it will be appreciated that the basic steering of wheel 11 always will steer the truck, regardless of the particular type of steering.

I have thought it unnecessary to describe means for driving the truck, since those persons skilled in the art will be able to arrange traction motors for that purpose. For example, each of the rear truck wheels 11, 12 may be equipped with a traction motor, not shown, on the corresponding rotating mounting 15 or 16, and comprising a steering and traction unit adapted to rotate on the truck frame 10.

I believe that the construction and operation of my exceedingly novel steering mechanism will now be understood, and that its very considerable advantages will be fully appreciated. Through my invention, it is possible to steer different pairs of wheels on an industrial truck, whereby to effect different types of steered movement of the truck. In each case two wheels will be steered, thus contributing very effective steering of the truck. Actually, the steering in each case may be rather conventional, with two wheels steered while two further wheels are locked against steering. That will simplify the steering control to a considerable extent, despite the fact that the truck maneuvers in different directions. Further, my mechanism is easily arranged to effect steering that is geometrically correct, without regard to the direction of steer. It will be appreciated also that all of the steering functions in my invention can be very easily controlled merely through the actuation of hydraulic or manual means.

I believe, therefore, that persons skilled in the art will recognize the considerable value of my novel steering mechanism, and will fully appreciate the importance of my invention in the industrial truck art.

I now claim:

1. In a truck of the class described, a series of wheels, a rotating mounting for each of said wheels, means for imparting guided steering rotation to one of said wheels on its mounting, controller means extending between certain of said rotating mountings for rotating their wheels relatively to one another, and means for selectively controlling said controller means to align a wheel relatively to said one of said wheels so that steered rotation will be imparted to a selected additional wheel while any remaining wheels are released for independent rotation on their rotating mountings.

2. In a truck of the class described, a series of wheels, a rotating mounting for each of said wheels, means for imparting guided steering rotation to one of said wheels on its mounting, controller means extending between certain of said rotating mountings for rotating their wheels relatively to one another, means for selectively controlling said controller means to align a wheel relatively to said one of said wheels so that steered rotation will be imparted to a selected additional wheel, and means for holding in fixed directional positions relatively to said truck one or more wheels that are not selected.

3. In a truck of the class described, a series of wheels, means mounting each wheel for steering rotation relatively to said truck about a substantially vertical axis, means for imparting guided steering rotation to one of said wheels on its said mounting means, interconnecting means between certain of said wheel mountings adapted to be actuated to rotate said wheels relatively to one another on said mountings, and means for selectively actuating said interconnecting means to align a wheel relatively to said one of the wheels whereby said means for imparting steered rotation to said one wheel impart related steering also to a selected additional wheel.

4. In a truck of the class described, a series of wheels, a rotating mounting for each wheel, means for imparting guided steering rotation to one of said wheels on its mounting, hydraulic rams interconnecting certain of said rotating mountings and adapted to be actuated to rotate said wheels relatively to one another on their mountings, said rams when hydraulically inactive allowing independent rotation of said wheels on said mountings, and means for selectively applying fluid pressure to certain rams to align a wheel relatively to said one of the wheels, the fluid pressure making those rams rigid whereby said means for imparting steering rotation to said one wheel will impart related steering also to a selected additional wheel.

5. In a truck of the class described, a series of wheels, a rotating mounting for each of said wheels, means for imparting guided steering rotation to one of said wheels on its mounting, a rod connected to each of said rotating mountings and movable relatively to rods on the other mountings to permit independent rotation of said wheels on said mountings, means for selectively moving certain of said rods relatively to one another to rotate the mounting of a selected wheel into aligned relation to the mounting of said one wheel, said rods then holding those wheels in aligned relation, whereby the means for imparting steering rotation will impart steering to different combinations of wheels, and means for controlling the steering position of each wheel on its mounting when that wheel is not selected and does not form part of a steered combination.

6. In a truck of the class described, a pair of wheels, a rotating mounting for each of said wheels, means for imparting guided steering rotation to one of said wheels on its mounting, a rod connected to each of said rotating mountings and movable relatively to a rod on the other mounting to permit independent rotation of said wheels on said mountings, means for locking said rods against relative movement to form in effect an integral rod whereby the means for imparting steering rotation to said one wheel impart related steering also to the other wheel, and means for controlling the steering position of said other wheel on its mounting when said rods are not locked.

7. In a truck of the class described, a series of wheels, a rotating mounting for each wheel, hydraulic rams interconnecting certain of said rotating mountings, said rams when hydraulically inactive allowing independent steered rotation of said wheels on their mountings, stop means limiting the independent rotation of said wheels when those wheels are aligned with one another relatively to one another, and means for applying fluid pressure to said hydraulic rams selectively to hold said stop means in limiting engagement whereby to effect a predetermined steering relation between selected wheels, while leaving a further wheel rotatable independently on its mounting.

8. In a truck of the class described, a series of wheels, a rotating mounting for each of said wheels, means for imparting guided steering rotation to one of said wheels on its mounting, a rod connected to each of said rotating mountings and movable relatively to rods on the other mountings to permit independent rotation of said wheels on said mountings, stop means moving into limiting engagement between certain rods to limit relative steering rotation between corresponding wheels when those wheels are aligned with one another, hydraulic rams selectively pressurized to hold said stop means engaged whereby the steering of said one wheel will effect steering of either of two other wheels in predetermined relation to said one wheel, and means for controlling the steering position of each wheel when not steered in predetermined relation to said one wheel.

9. In a truck of the class described, a pair of wheels, a rotating mounting for each wheel, means for rotating each wheel on its mounting to steer both wheels together and also relatively to each other, limit means acting between the wheel mountings and including portions moved into engagement with one another through the relative steering rotation of the wheels so as to effect an aligned steering relation between said wheels, and said wheels steering in said predetermined relation when rotated in the same direction by the wheel rotating means.

10. In a truck of the class described, a pair of wheels individually mounted for steering rotation, two rods connected one to each wheel and adapted to move longitudinally whereby to rotate said wheels on their mountings, each rod extending substantially in aligned relation toward the other rod, stop means moving into limiting engagement between juxtaposed ends of the rods to limit relative movement between said rods, a hydraulic ram extending between said rods, means for applying fluid pressure to said ram to hold said stop means engaged so that said rods will in effect be an integral rod holding the wheels in a predetermined steering relation, and said rams when relieved of the fluid pressure enabling said rods to move so that said wheels can rotate into a different steering relation to each other.

11. In a truck of the class described, a series of wheels, a rotating mounting for each wheel, hydraulic rams interconnecting certain of said rotating mountings and having cylinders and pistons moving relatively to one another to permit independent steering rotation of said wheels on said mountings, and means for selectively applying fluid pressure to said rams to lock their cylinders and pistons whereby to control the steering relation between different wheels and different combinations of wheels.

12. In a truck of the class described,
a series of wheels,
a rotating mounting supporting each individual wheel for steering rotation,
steering means connected to the rotating mounting of one particular wheel for steering that wheel and at all times effective to control the steering position of said wheel,
said wheel forming a basic steering wheel,
relatively movable parts extending between the basic steering wheel mounting and the mountings of certain other wheels,
power means connected to said parts for moving said parts relatively to one another whereby to rotate a selected wheel into aligned relation to the basic steering wheel,
so that said power means when actuated will form a combination of wheels in steering position controlled by the steering means and thereafter steered by said steering means,
and means for controlling the steering position of each wheel that does not form a part of the combination formed by the actuation of said power means and that is not steered by the steering means.

13. In a truck of the class described,
a series of wheels,
a rotating mounting supporting each individual wheel for steering rotation,
steering means connected to the rotating mounting of one particular wheel for steering that wheel and at all times effective to control the steering position of said wheel,
said wheel forming a basic steering wheel,
relatively movable parts extending between the basic steering wheel mounting and the mountings of certain other wheels,
power means connected to said parts for moving said parts whereby to rotate a selected wheel relatively to the basic steering wheel,
stop means moving into limiting engagement between the relatively movable parts when a wheel rotates into aligned relation to the basic steering wheel,
said power means when actuated holding the stop means engaged so that the selected wheel forms with the basic wheel a combination of wheels in steering position controlled by the steering means and thereafter steered by said steering means,
and means for controlling the steering position of each wheel that does not form a part of the combination formed by the actuation of said power means and that is not steered by the steering means.

14. In a truck of the class described,
a series of wheels,
a rotating mounting supporting each individual wheel for steering rotation,
steering means connected to the rotating mounting of one particular wheel for steering that wheel and at all times effective to control the steering position of said wheel,
said wheel forming a basic steering wheel,
hydraulic rams extending between the basic steering wheel mounting and the mountings of certain other wheels,
means for applying fluid pressure to a ram whereby to rotate a selected wheel into aligned relation to the basic steering wheel,
so as to form a combination of wheels in steering position controlled by the steering means and thereafter steered by said steering means,
and means for controlling the steering position of each wheel that does not form a part of the combination formed by the pressurizing of a hydraulic ram and that is not steered by the steering means.

15. In a truck of the class described,
a series of wheels,
a rotating mounting supporting each individual wheel for steering rotation,
steering means connected to the rotating mounting of one particular wheel for steering that wheel and at all times effective to control the steering position of said wheel,
said wheel forming a basic steering wheel,
hydraulic rams extending between the basic steering wheel mounting and the mountings of certain other wheels,
means for applying fluid pressure to a ram whereby to rotate a selected wheel relatively to the basic steering wheel,
stop means acting between the wheels and moving into limiting engagement when the selected wheel rotates into aligned relation to the basic wheel,
the fluid pressure holding the stop means engaged so that the selected wheel forms with the basic wheel a combination of wheels in steering position controlled by the steering means and thereafter steered by said steering means,
and means for controlling the steering position of each wheel that does not form a part of the combination formed by the actuation of said power means and that is not steered by the steering means:

16. In a truck of the class described,
a pair of wheels,
a rotating mounting for each of said wheels,
steering means connected to the rotating mounting of a particular one of said wheels to impart steering rotation to that wheel and at all times effective to control the steering position of said wheel,
relatively movable parts interconnecting the mountings of the pair of wheels,
power means connected to said parts for moving said parts relatively to one another to rotate the other of said pair of wheels into aligned relation to the controlled steering position of said particular wheel,
said steering means being effective upon actuation of the power means to steer said other wheel with the one particular wheel,
and means for controlling the steering position of said other wheel when said power means are not actuated.

References Cited in the file of this patent

UNITED STATES PATENTS

| | | |
|---|---|---|
| 2,470,496 | Krilanovich | May 17, 1949 |
| 2,715,534 | Hoge et al. | Aug. 16, 1955 |
| 2,719,043 | Oppenheimer | Sept. 27, 1955 |
| 2,732,904 | Schroeder | Jan. 31, 1956 |
| 2,783,849 | Armington et al. | Mar. 5, 1957 |
| 2,834,605 | McCollough | May 13, 1958 |
| 2,842,376 | Krilanovich | July 8, 1958 |

FOREIGN PATENTS

| | | |
|---|---|---|
| 745,519 | Great Britain | Feb. 29, 1956 |